US008978160B2

United States Patent
Alrabady et al.

(10) Patent No.: US 8,978,160 B2
(45) Date of Patent: Mar. 10, 2015

(54) METHOD FOR SELECTIVE SOFTWARE ROLLBACK

(75) Inventors: Ansaf I. Alrabady, Livonia, MI (US); Kevin M. Baltes, Wixom, MI (US); Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 13/612,225

(22) Filed: Sep. 12, 2012

(65) Prior Publication Data

US 2014/0075197 A1 Mar. 13, 2014

(51) Int. Cl.
*G06F 21/12* (2013.01)

(52) U.S. Cl.
USPC .......... 726/30; 726/26; 726/27; 713/152; 717/168; 717/170; 717/171; 717/172

(58) Field of Classification Search
None
See application file for complete search history.

(56) References Cited

U.S. PATENT DOCUMENTS

| 6,074,434 | A  | * | 6/2000 | Cole et al. ............... 717/173 |
| 8,499,349 | B1 | * | 7/2013 | Cruz et al. ............... 726/24 |
| 2003/0163702 | A1 | * | 8/2003 | Vigue et al. ............. 713/176 |
| 2008/0178171 | A1 | * | 7/2008 | Sueyoshi et al. ......... 717/171 |
| 2009/0049288 | A1 | * | 2/2009 | Weissman ................ 712/245 |
| 2010/0132018 | A1 | * | 5/2010 | Takala et al. ............ 726/5 |
| 2011/0231831 | A1 | * | 9/2011 | Smith et al. ............. 717/170 |
| 2012/0079471 | A1 | * | 3/2012 | Vidal et al. .............. 717/169 |

* cited by examiner

*Primary Examiner* — Kaveh Abrishamkar
*Assistant Examiner* — Adrian Stoica
(74) *Attorney, Agent, or Firm* — John A. Miller; Miller IP Group, PLC (57) ABSTRACT

A system and method for validating a software file to be installed into a controller. The method includes preparing the software file including assigning a software version code to the software file, assigning a security version code to the software file, and signing the software file with the software file version code and the security version code. The signed software file is presented to the controller for installing on the controller and the controller verifies the software file signature to determine if the software file is valid and the security version code is valid. The controller allows the software file to be installed in the controller if both the signed software file is valid and the security version code is valid.

15 Claims, 5 Drawing Sheets

METHOD FOR SELECTIVE SOFTWARE ROLLBACK

BACKGROUND OF THE INVENTION

1. Field of the Invention

This invention relates generally to a system and method for preventing an old vulnerable version of a software file to be flashed in a controller and, more particularly, to a system and method for preventing an old vulnerable version of a software file to be flashed in a vehicle electronic control unit (ECU) that includes updating a security code each time a new software file is released to correct a security vulnerability.

2. Discussion of the Related Art

Most modern vehicles include electronic control units (ECUs), or controllers, that control the operation of vehicle systems, such as the powertrain, climate control system, infotainment system, body systems, chassis systems, and others. Such controllers require special purpose-designed software in order to perform the control functions. With the increasing number and complexity of these controllers, and the growing threat posed by developers of malicious software, it is more important than ever to authenticate the source and content of binary files that are loaded on automotive controllers. The consequences of using software that is not properly validated, or worse, maliciously-designed, in a vehicle controller include unintended behavior of the vehicle or its systems, loss of anti-theft features on the vehicle, potential tampering with components such as the odometer, and loss of other vehicle features and functions.

One known digital coding technique is referred to as asymmetric key cryptography that uses digital signatures for authenticating files that are programmed into controllers. As would be well understood by those skilled in the art, asymmetric key cryptography uses a pair of mathematically-related keys, known as a private key and a public key, to encrypt and decrypt a message. To create a digital signature, a signer uses his private key, which is known only to himself, to encrypt a message. The digital signature can later be decrypted by another party using the public key, which is paired to the signer's private key.

Flashing is a well known process for uploading software, calibration files and other applications into a flash memory of a vehicle ECU or other programmable device. A bootloader is an embedded software program loaded on the ECU that provides an interface between the ECU and a programming device that is flashing the software. The bootloader may employ asymmetric key cryptography and store a public key that must be used to decode the digital signature transferred by the programming device before allowing the ECU to execute the software or calibration.

The file header associated with a software file typically includes information about the file and information relating to the code that follows that header including module ID, compatibility ID, signature, address ranges, etc. Once a software file has been released, properly flashed and is operating in an ECU, it may be discovered that the software file has some security vulnerability where a potential hacker could maliciously gain access to the ECU through the vulnerability. When such security vulnerability is identified, the vehicle manufacturer may revise the software file so that security vulnerability is eliminated. The new software file will then be flashed into the ECU to replace the vulnerable software programmed into the ECU memory. However, the ECU may still be vulnerable because a potential hacker having the vulnerable old version of the software file with the proper authentic signature could load that software file back onto the ECU, and then exploit the security vulnerability. In other words, if an ECU has been flashed with a revised software file that corrects a security vulnerability, a potential hacker may gain access to an older version of the software file that has been properly signed, but includes the security vulnerability, load that software file back onto the ECU and then exploit the security vulnerability.

SUMMARY OF THE INVENTION

In accordance with the teachings of the present invention, a system and method are disclosed for validating a software file to be installed into a controller. The method includes preparing the software file including assigning a software version code to the software file, assigning a security version code to the software file, and signing the software file with the software file version code and the security version code. The signed software file is presented to the controller for installing on the controller and the controller verifies the software file signature to determine if the software file is valid and the security version code is valid. The controller allows the software file to be installed in the controller if both the signature is valid and the security version code is valid as well as all other required conditions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for preventing an older vulnerable version of a software file to be flashed on an ECU is merely exemplary in nature, and is in no way intended to limit the invention or its applications or uses. For example, as discussed herein, the technique for preventing an older vulnerable version of a software file to be flashed has application for a vehicle ECU. However, as will be appreciated by those skilled in the art, the technique may have application for other controllers.

Figure 1:
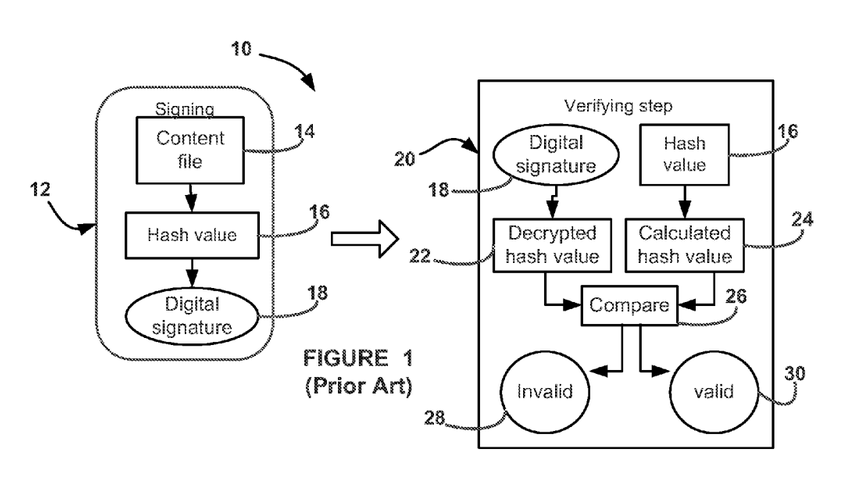
FIG. 1 is a schematic block diagram showing a process for verifying a digital signature.

FIG. 1 is a block diagram 10 of a known method for using asymmetric key digital signatures for authenticating files which are programmed into controllers. As would be understood by those skilled in the art, asymmetric key cryptography uses a pair of mathematically-related keys known as a private key and a public key to encrypt and decrypt a message. To create a digital signature, a signer uses his private key, which is known only to himself, to encrypt a digital message. The digital signature can later be decrypted by another party using the public key that is paired to the signer's private key to authenticate a file or message.

In a signing step 12, a content file 14 is provided, where the content file 14 could be a piece of software, a calibration file, or other "soft-part" content to be used in a controller. A hash calculation is performed on the content file 14 to produce a hash value 16 of the content file 14. The hash value 16 is then encrypted with the signer's private key to produce a digital signature 18, where the digital signature 18 is only good for that particular content file.

The digital signature 18 and the content file 14 are then used in a verifying step 20, which would be performed by the bootloader in the ECU in the application being discussed herein. The digital signature 18 is decrypted using the signer's public key to produce a decrypted hash value 22. Meanwhile, a hash calculation is performed on the content file 14 by the verifier, to produce a calculated hash value 24. At box 26, the decrypted hash value 22 is compared to the calculated hash value 24. If the decrypted hash value 22 matches the calculated hash value 24, then a valid determination is issued at oval 28, and the content file 14 is used. If the decrypted hash value 22 does not match the calculated hash value 24, then an invalid determination is issued at oval 30, and the content file 14 is not used.

Figure 2:
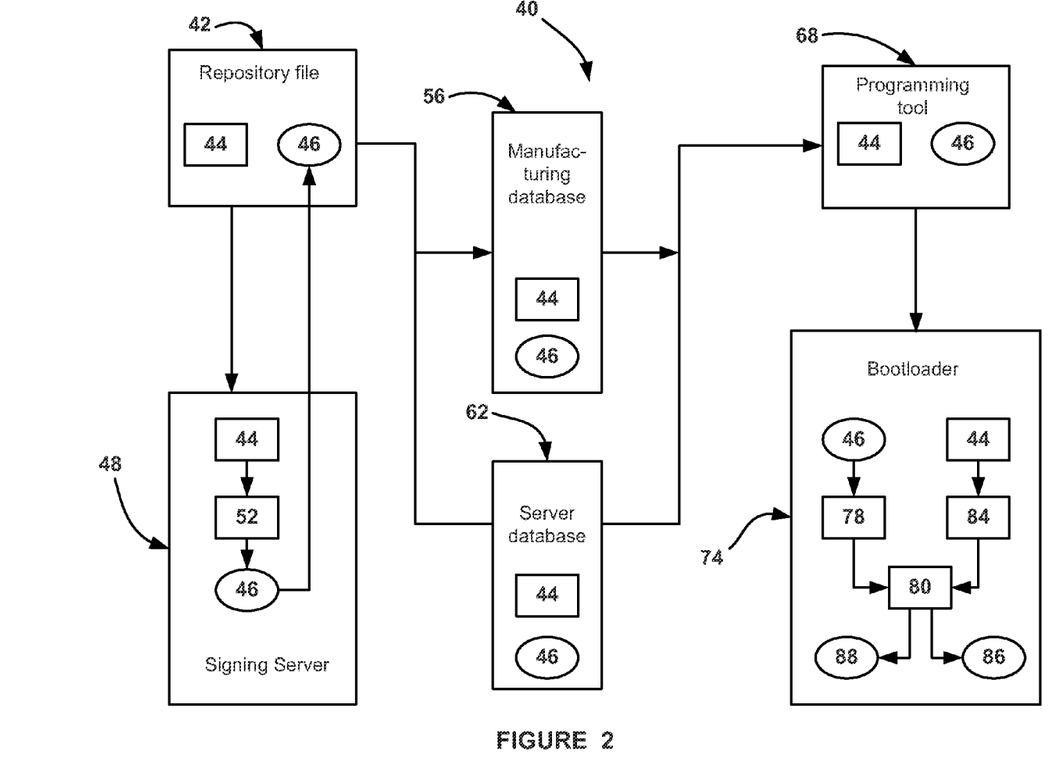
FIG. 2 is a block diagram of a method for signing and verifying electronic content using a digital signature including the delivery of content and signature files from programming source to executing controller.

FIG. 2 is a block diagram 40 showing a method for signing and verifying electronic content using a digital signature, including the delivery of content and signature files from a programming source to an executing controller. A file repository 42 stores a software executable, a calibration file or other "soft-part" file, collectively known as a content file 44. The content file 44 is typically a binary file. It is desired to obtain a digital signature 46 for the content file 44. In order for the content file 44 to be digitally signed, the content file 44 is provided to a signing server 48. On the signing server 48, a hash calculation is performed on the content file 44 to produce a hash value 52. The hash value 52 is encrypted using the private key stored on the signing server 48, where the encryption produces the digital signature 46. The digital signature 46 is then provided back to the file repository 42.

At this point, the content file 44 and the digital signature 46 both exist in the repository 42. The challenge is then to deliver the content file 44 and the digital signature 46 through the various business systems used by the automotive manufacturer and install and validate the content file 44 on a controller in a vehicle. In general, an automotive manufacturer will have at least two organizations or departments responsible for installing software and calibration files on controllers in vehicles, namely, manufacturing and service. FIG. 2 shows a manufacturing database 56, used by the automotive manufacturer's manufacturing department for managing electronic files which are installed as "parts" in production vehicles. FIG. 2 likewise shows a service database 62, used by the auto manufacturer's service department for managing electronic files which are installed as "service parts" in vehicles that are worked on in a service facility. As shown in FIG. 2, the manufacturing database 56 and the service database 62 both receive copies of the content file 44 and the digital signature 46 to be used for the respective functions of the manufacturing and service departments.

In order to actually install or flash the content file 44 on a controller in a vehicle, a programming tool 68 is used. As shown, the programming tool 68 also receives a copy of the content file 44 and the digital signature 46. That is, the manufacturing department could provide the content file 44 and the digital signature 46 from the manufacturing database 56 to the programming tool 68 for installation on a new production vehicle, or the service department could provide the content file 44 and the digital signature 46 from the service database 62 to the programming tool 68 for installation on a vehicle being serviced.

The next step is for the programming tool 68 to install the content file 44 on a controller in a vehicle. ECU 74 is the controller that will actually use the content file 44. Following is a brief discussion of the architecture of the ECU 74. The software on the ECU 74 consists of a bootloader, a software executable, and one or more calibration files. For the purposes of this discussion, the ECU 74 is assumed to have a single central processing unit (CPU). In actual vehicles, the ECU 74 could have multiple CPUs, and each CPU would have a bootloader, a software executable, and one or more calibration files.

The bootloader in the ECU 74 is responsible for validating and installing new software executables and calibration files. Thus, the functions described in this paragraph are performed by the bootloader in the ECU 74. The programming tool 68 provides the content file 44 and the digital signature 46 to the ECU 74. The digital signature 46 is decrypted by the bootloader using the public key of the repository 42 to produce a decrypted hash value 78. The public signing key may be resident in the ECU 74 or be provided to the ECU 74 in conjunction with the content file 44 and digital signature 46. Meanwhile, a hash calculation is performed on the content file 44 by the bootloader to produce a calculated hash value 84. At box 80, the decrypted hash value 78 is compared to the calculated hash value 84. If the decrypted hash value 78 matches the calculated hash value 84, then a valid determination 88 is issued, and the content file 44 is used. If the content file 44 to be used is a software executable, the bootloader installs it as the new software executable on the ECU 74. If the content file 44 to be used is a calibration file, the bootloader installs it as one of the one or more calibration files on the ECU 74. If the decrypted hash value 78 does not match the calculated hash value 84, then an invalid determination 86 is issued, and the content file 44 is not used on the ECU 74.

Figure 3:
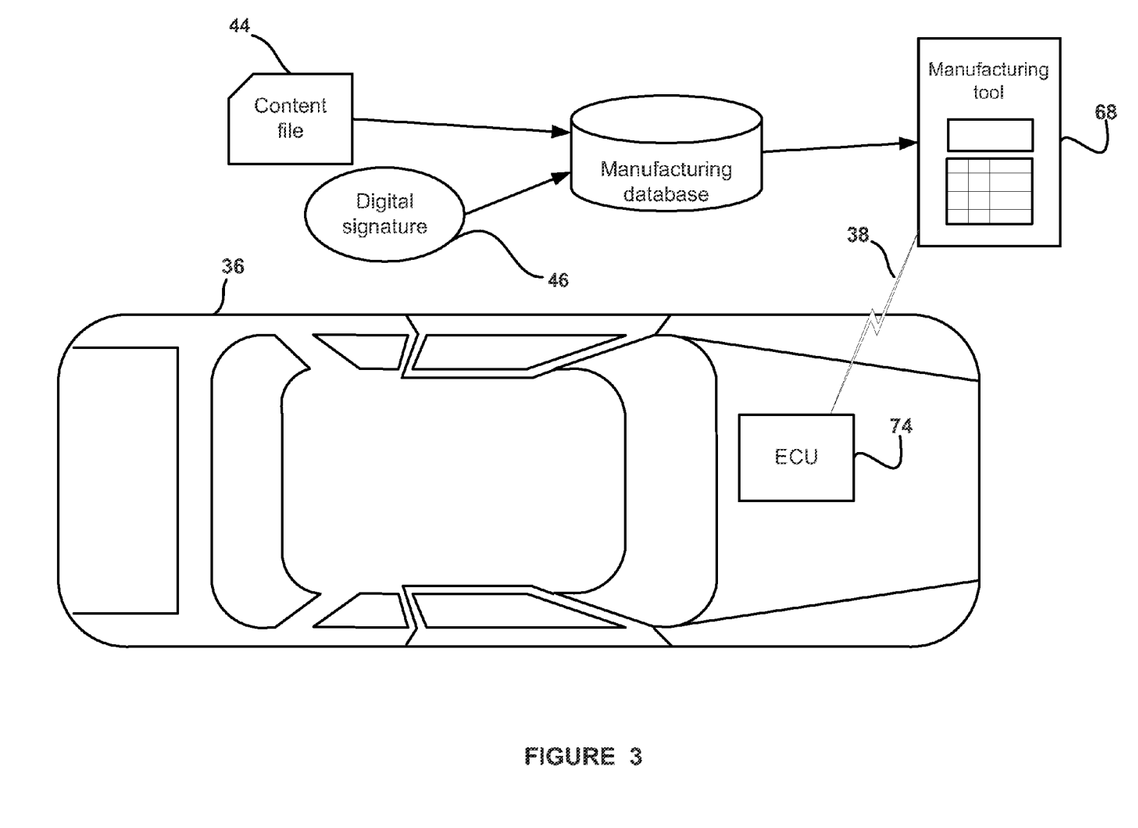
FIG. 3 is a schematic diagram showing how electronic content and a digital signature are physically delivered to a controller in a vehicle.

FIG. 3 is a schematic diagram showing how electronic content and digital signature files are physically delivered to a vehicle controller. A vehicle 36 includes the ECU 74 shown in FIG. 2 and discussed above. The ECU 74 could control the engine, transmission, chassis, body, infotainment, or other system on the vehicle 36. The content file 44 and the digital signature 46 are provided to a central database, shown here as the manufacturing database 56. The transfer of the content file 44 and the digital signature 46 to the manufacturing database 56 could take place over a company network. The manufacturing database 56 provides the content file 44 and the digital signature 46 to the programming tool 68, where this transfer could be accomplished by attaching the programming tool 68 to a computer which has access to the database 56. The programming tool 68 communicates with the ECU 74 via a connection 38, which may be wired or wireless. With the connection 38 established, the content file 44 and the digital signature 46 can be downloaded from the programming tool 68 to the ECU 74, where the bootloader can perform the security verification functions discussed previously.

The present invention proposes a technique for preventing a vulnerable, but authentic, version of a software file to be flashed into a vehicle ECU. Particularly, a security version (SECVER) code that identifies the particular security version of the software file in addition to the other parameters of the software file, such as software file version code, model module ID, compatibility ID, etc., is employed as part of the file header to identify the security level of the file. It is noted that the security version code is included in the programmed part of the software file and is included in the digital signature verification. Each time a new version of a software file is prepared for release, the new version of the file may or may not include code to correct a recognized security vulnerability. For example, the new release of a software file may be for a number of reasons not related to correcting a security vulnerability, such as adding functionality, providing the file for different vehicles, etc. If the new version of the software file does not address a security vulnerability, then the security version code remains the same, but the release identification number of the software is updated. If the software file update does include code to correct a security vulnerability, then the security version code is updated for that new version. Thus, any previous versions of the software file will not include that new and updated security version code. Hence, a potential hacker with a properly signed older version of the software file that includes an earlier security version code will not be allowed to be flashed into the ECU. Particularly, the bootloader would verify the signature on the file header of the new software file prior to it being flashed and will also verify the security version code to be equal to or later than the stored security version code of the currently existing software file already installed on the ECU.

Figure 4:
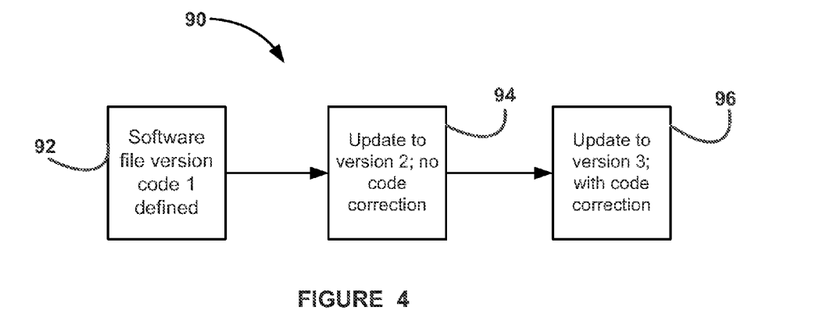
FIG. 4 is a flow chart diagram showing a process for updating a particular software file with each new software release and a security level code.

The above discussion can be represented by flow chart diagram 90 shown in FIG. 4. Software file version code 1 is defined at box 92 and includes security version code 1 representing the initial release version of the software and the current security code at a particular point in time. If that software file is updated to a second version of the software file that does not include code to correct a security vulnerability represented at box 94, the release code identifying the updated software file is updated to, for example, software file version code 2, but the security version code will stay the same as security version code 1 from the previous version. If a security vulnerability is identified in the second version code 2 of the software file after it is released, then a new version of the software file may be prepared and released to correct the vulnerability at box 96 including a new software file version code, for example, software file version code 3, and an updated later security version code, for example, security version code 2, for the security fix.

If a new version of the software file is released for installing, the bootloader will only allow that version to be flashed into the ECU if it is properly signed and includes a security version code that is the same or higher than the security version code that is currently stored on the ECU. If the new version of the software file includes a higher security version code than the currently stored software file, the bootloader will update its security version code to the new security version code so that any software file that includes a lower level security version code will not be allowed to be flashed going forward. Thus, if a bootloader in an ECU receives a request to flash a new software file, it will determine whether the software file is properly signed, and if so, whether it has the proper security version code. If the properly signed software file has a lower security version code than the security version code currently stored in the bootloader, the bootloader will not allow the software file to be flashed. If the security version code on the new software file includes the same security version code as stored in the bootloader, then the bootloader will allow the software file to be flashed and will maintain that security version code in the bootloader. If the properly signed software file includes a higher security version code than what is currently stored on the bootloader, the bootloader will allow the software file to be flashed and will update its stored security version code to that level provided on the software file, so now any later version of the software file to be flashed will need to have that level or higher of the security version code.

Figure 5:
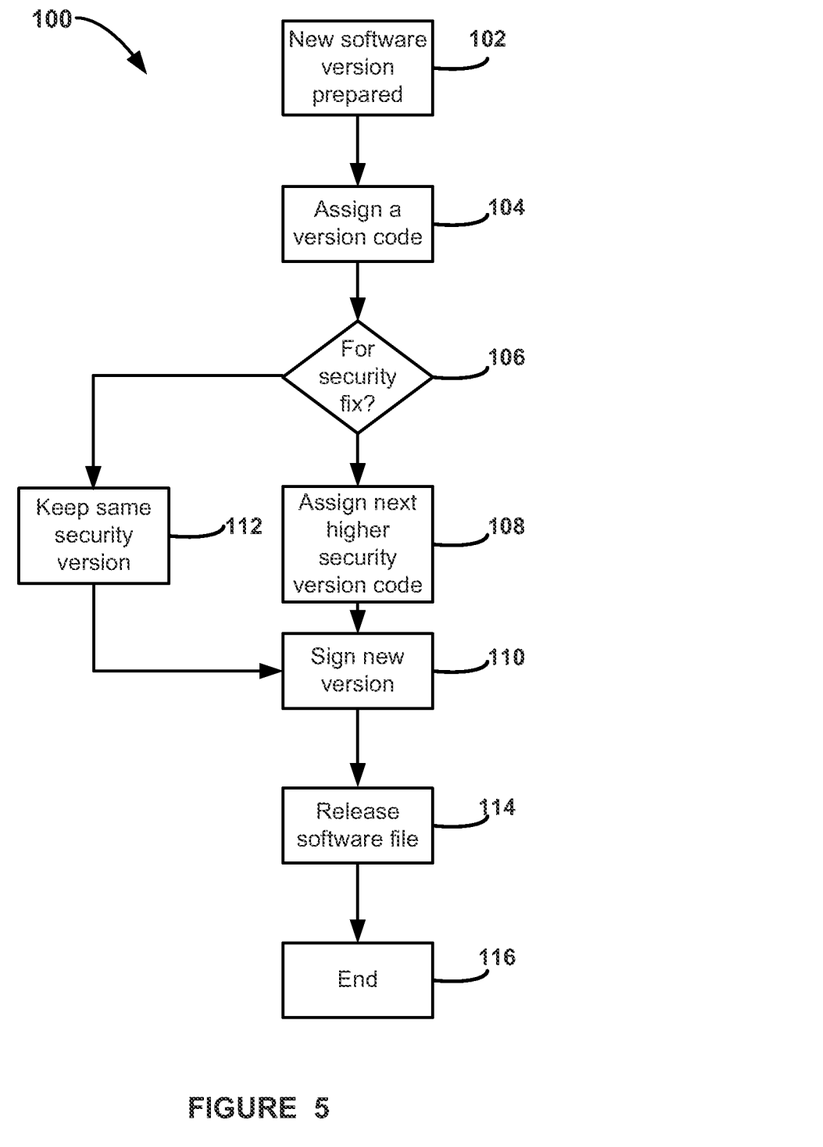
FIG. 5 is a flow chart diagram showing a process of installing a software file on an ECU.

FIG. 5 is a flow chart diagram 100 showing a process for assigning a software version code and a security version code each time a new version of a software file is released. At box 102, the new version of the software file is prepared and made ready for release. At box 104, the new version of the software file is assigned the new software file version code. At decision diamond 106, the software release engineer determines whether the new release is for a security vulnerability fix, and if so, the software release engineer assigns the next higher security version code to the software file at box 108. The software release engineer then signs the software file at box 110. If the new software version is not to correct a security vulnerability at the decision diamond 106, then the software release engineer keeps the same security version code at box 112, and proceeds to the box 110 to sign the new version of the software file. The signed software file is then released at box 114 and the process terminates at box 116.

Figure 6:
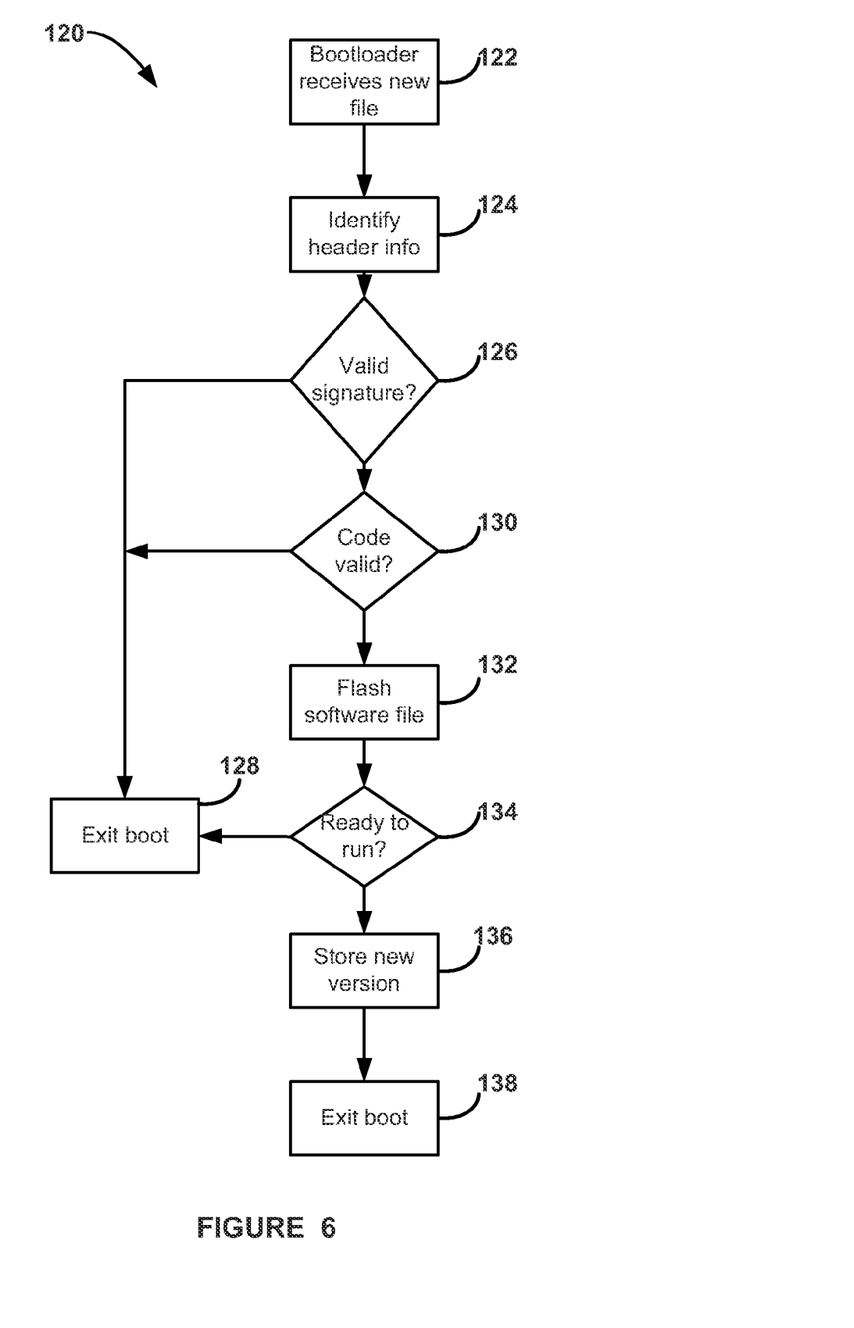
FIG. 6 is a flow chart diagram showing a process for determining whether a new software file should be flashed into an ECU.

FIG. 6 is a flow chart diagram 120 showing a process for the bootloader in the ECU to determine whether the new software file should be flashed into the ECU. The bootloader receives the new software file at box 122 and identifies the header information at box 124. The bootloader determines whether the software file has a valid signature at decision diamond 126, and if not, the bootloader exits the boot at box 128. If the algorithm determines that the software file does have a valid signature at the decision diamond 126, then the algorithm determines whether the security version code is valid at decision diamond 130. If the security version code is an older code than what the currently stored security version code is in the bootloader, then the bootloader exits the boot at the box 128. If both the signature is valid and the security version code is valid at the decision diamonds 126 and 130, respectively, then the bootloader installs or flashes the software file at box 132. The bootloader then determines whether all of the remaining requirements have been met to run the software file at decision diamond 134, and if not, exits the boot without running the software file at the box 128. If the algorithm determines that the security version code on the software file is higher than the previously stored security version code in the bootloader, then the bootloader stores the new version of the security code at box 136 for the next software release, and exits the boot at box 138.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for validating a software file to be installed into a controller, said method comprising:
updating the software file;
assigning a software version code to the software file;
assigning a security version code to the software file, wherein assigning a security version code to the software file includes keeping the security version code the same if the software file has not been updated for correcting a security vulnerability and increasing the security version code if the software file has been updated for correcting a security vulnerability; digitally signing the software file with the software file version code and the security version code;
presenting the signed software file to the controller for installing on the controller;
verifying the software file signature in the controller to determine if the software file is valid;
determining whether the security version code in the software file is valid if the controller determines that the signed software file is valid; and
allowing the software file to be installed in the controller if the signed software file is valid and the security version code is valid.

2. The method according to claim 1 wherein determining whether the security version code in the software file is valid includes determining whether the security version code is an older version of the security version code stored in the controller, and if so, not allowing the software file to be loaded in the controller.

3. The method according to claim 1 wherein determining whether the security version code in the software file is valid includes determining whether the security version code is the same or a later version of the security version code stored in the controller, and if so, allowing the software file to be loaded in the controller.

4. The method according to claim 3 further comprising changing the stored version of the security version code in the controller to the security version code assigned to the software file if the security version code assigned to the software file is greater than the stored version of the security version code.

5. The method according to claim 1 wherein signing the software file includes using asymmetric key cryptography employing digital signatures and public and private keys and verifying the software file includes digital signature verification.

6. The method according to claim 1 wherein the controller is an electronic control unit (ECU) on a vehicle.

7. A method for validating a software file to be installed into an electronic control unit (ECU) on a vehicle, said method comprising:
updating the software file;
assigning a software version code to the software file;
assigning a security version code to the software file, wherein assigning a security version code to the software file includes keeping the security version code the same if the software file has not been updated for correcting a security vulnerability and increasing the security version code if the software file has been updated for correcting a security vulnerability;
digitally signing the software file with the software file version code and the security version code;
presenting the signed software file to the ECU for installing on the controller;
verifying the software file signature in the ECU to determine if the software file is valid; and
determining whether the security version code in the software file is valid if the ECU determines that the signed software file is valid, wherein determining whether the security version code in the software file is valid includes determining whether the security version code is an older version of the security version code stored on the controller, and if so, not allowing the software file to be installed in the controller, and if not, allowing the software file to be installed in the controller.

8. The method according to claim 7 further comprising changing the stored version of the security version code in the controller to the security version code assigned to the software file if the security version code assigned to the software file is greater than the stored version of the security version code.

9. The method according to claim 7 wherein signing the software file includes using asymmetric key cryptography employing digital signatures and public and private keys and verifying the software file includes digital signature verification.

10. A system for validating a software file to be installed into a controller, said system comprising:
means for updating the software file;
means for assigning a software version code to the software file, wherein the means for assigning a security version code to the software file keeps the security version code the same if the software file has not been updated for correcting a security vulnerability and increasing the security version code if the software file has been updated for correcting a security vulnerability;
means for assigning a security version code to the software file;
means for signing the software file with the software file version code and the security version code;
means for presenting the signed software file to the controller for installing on the controller;
means for verifying the software file signature in the controller to determine if the software file is valid;
means for determining whether the security version code in the software file is valid if the controller determines that the signed software file is valid; and
means for allowing the software file to be installed in the controller if the software file is valid and the security version code is valid.

11. The system according to claim 10 wherein the means for determining whether the security version code in the software file is valid determines whether the security version code is an older version of the security version code stored on the controller, and if so, not allowing the software file to be loaded in the controller.

12. The system according to claim 10 wherein the means for determining whether the security version code in the software file is valid determines whether the security version code is the same or a later version of the security version code stored on the controller, and if so, allowing the software file to be loaded in the controller.

13. The system according to claim 12 further comprising means for changing the stored version of the security version code in the controller to the security version code assigned to the software file if the security version code assigned to the software file is greater than the stored version of the security version code.

14. The system according to claim 10 wherein the means for signing the software file uses asymmetric key cryptography employing digital signatures and public and private keys and the means for verifying the software file employs digital signature verification.

15. The system according to claim 10 wherein the controller is an electronic control unit (ECU) on a vehicle.

\* \* \* \* \*